United States Patent
Starlinger-Huemer et al.

(10) Patent No.: US 7,077,344 B2
(45) Date of Patent: Jul. 18, 2006

(54) DEVICE FOR THE COMMINUTION OF MATERIALS

(75) Inventors: Erna Starlinger-Huemer, Vienna (AT); Angelika Huemer, Vienna (AT); Markus Fellinger, Wilhering (AT)

(73) Assignee: Starlinger & Co. Gesellschaft m.b.H., Vienna (AT)

( * ) Notice: Subject to any disclaimer, the term of this patent is extended or adjusted under 35 U.S.C. 154(b) by 76 days.

(21) Appl. No.: 10/939,235

(22) Filed: Sep. 10, 2004

(65) Prior Publication Data

US 2005/0082402 A1    Apr. 21, 2005

Related U.S. Application Data

(63) Continuation of application No. PCT/AT03/00069, filed on Mar. 11, 2003.

(30) Foreign Application Priority Data

Mar. 12, 2002 (AT) ............................... A 376/2002

(51) Int. Cl.
  *B02C 19/22* (2006.01)
(52) U.S. Cl. ................ 241/34; 241/67; 241/260.1
(58) Field of Classification Search ............ 241/260.1, 241/65, 66, 67, 69, 34; 425/202, 378.1, 376.1
  See application file for complete search history.

(56) References Cited

U.S. PATENT DOCUMENTS 5,693,276 A * 12/1997 Weissfloch .................. 264/140

FOREIGN PATENT DOCUMENTS

| AT | 407 360 B | 2/2001 |
|---|---|---|
| DE | 1 166 460 | 3/1964 |
| DE | 1 261 661 | 2/1968 |
| DE | 23 10 463 | 9/1974 |
| DE | 23 51 328 | 4/1975 |
| DE | 26 56 484 | 10/1977 |
| DE | 31 19 840 A1 | 3/1982 |
| DE | 34 12 158 A1 | 10/1985 |
| EP | 0 514 327 A1 | 11/1992 |
| JP | 59212219 | 12/1984 |
| JP | 2000169859 | 6/2000 |
| JP | 2000176935 | 6/2000 |
| JP | 2001038728 | 2/2001 |
| WO | WO 01/47678 | 7/2001 |
| WO | WO 01/81058 | 11/2001 |

* cited by examiner

*Primary Examiner*—Mark Rosenbaum
(74) *Attorney, Agent, or Firm*—Hoffmann & Baron, LLP

(57) ABSTRACT

A device for compacting loosely packed materials, in particular synthetic materials, comprises a shredder/conveyor rotor body arranged in a casing and drivable with the rotation around an axis of rotation and a consecutively arranged extruder with an extruder screw that is arranged rotatably and coaxially to the shredder/conveyor rotor body. Materials supplied to the shredder/conveyor rotor body are conveyed to the extruder screw, whereby they optionally are shredded. According to the invention, the shredder/conveyor rotor body is configured as a hollow body open at the front side opposite the extruder and has at least one rotary bearing in its interior, which rotary bearing rests on an abutment body projecting from the open front side into the interior of the shredder/conveyor rotor body.

23 Claims, 4 Drawing Sheets

DEVICE FOR THE COMMINUTION OF MATERIALS

CROSS-REFERENCE TO RELATED APPLICATIONS

This application is a continuation of International Patent Application No. PCT/AT03/00069 with a filing date of Mar. 11, 2003. This application claims priority to Austrian Application Serial No. A 376/2002 with a filing date of Mar. 12, 2002.

BACKGROUND OF THE INVENTION

The invention relates to a device for compacting loosely packed materials, in particular synthetic materials, comprising a shredder/conveyor rotor body arranged in a casing and rotatably drivable around an axis of rotation and a consecutively arranged extruder with an extruder screw that is arranged rotatably and coaxially to the shredder/conveyor rotor body so that materials supplied to the shredder/conveyor rotor body are conveyed to the extruder screw, whereby they optionally are shredded.

The material to be compacted, usually synthetic material, is supplied into a feeding hopper via suitable conveyor means such as a conveyor belt, a roll feeder, a lifting and tipping device or by manual charging, in which feeding hopper the material is pressed onto the shredder/conveyor rotor body by gravity or by a pressing device. Thereby, the synthetic material is compacted and optionally shredded between rotating knives formed at the periphery of the shredder/conveyor rotor body and stationary knives formed at the casing. At the same time, the compacted/shredded material is continuously conveyed further to the extruder screw in an axial manner.

Such a device is known, for instance, from WO 01/47678 A1. In said device, the discharge-end bearing of the cutting shaft has a negative impact on the conveying effect of the synthetic material. The webs provided for supporting the discharge-end bearing represent a substantial obstacle to the material transport and may lead to a considerable curtailment of the material flow, in particular in case of lightweight and fibrous materials. Furthermore, the maintenance of the bearing is difficult and its replacement, respectively, is hardly possible, since such can only be accomplished if the associated installations have been dismantled completely and/or the cutting shaft has been removed. Moreover, the bearing is exposed to an increased temperature load because of its assembly position, in particular if the associated screw is an extruder screw.

From AT 407971 B, a device is known which solves the above-mentioned problems in that the discharge-end bearing facing away from the drive is formed by the extruder screw itself, whereby a separate discharge-end bearing is completely omitted. However, said solution exhibits a disadvantage in that the cutting forces that occur lead to a very substantial radial strain on the extruder screw and hence to increased wear, in particular if the feed opening of the extruder screw is enlarged by pocket-like expansions which, on the one hand, increase the delivery rate of the extruder but, on the other hand, result in even more increased wear as the screw rests on the webs at selective points. Moreover, the drive-end bearing of the cutting shaft is expensive and can, in a fully functional machine, only be configured as a widely projecting portion. Since wear of the extruder screw cannot be avoided, the distance of the stationary knives as mentioned in said document must therefore be selected to be larger than usual in order to prevent the rotating knives from colliding with the stationary knives. This, in turn, creates an increased thermal load of the material caused by milling and can even result in the melting of the material, in particular in case of thermally sensitive materials such as an LLDPE stretch film.

The actual concept of positioning an extruder screw merely at the inner wall of the casing surrounding it was already known long before the filing date of AT 407971, for instance from the following printed publications: DE 26 56 484 A1, DE 23 51 328 A1, DE 31 19 840 A 1, DE 23 10 463 B2, DE 12 61 661 B.

From JP 2000176935, JP 2001038728, JP 2000169859 (drawings) and from WO 01/47678, a device is known wherein the material is discharged axially from the shredding device and is then delivered to an extruder at an angle of 90° relative to the centre line of the knife-supporting shaft, with the bearing opposite the drive being located at the end of the feed screw and a duct surrounding the feed screw exhibiting a downward-directed opening. One disadvantage of that design is that the material is pressed directly in the direction of the bearing by a compression of the feed screw and hence the sealing of the bearing against dust and impurities will involve substantial expenses and, furthermore, the deflection of the material toward the extruder will cause an additional thermal load of the material, thus leading to increased degradation values.

From EP 0 514 327 A1, a device is known wherein the material is discharged by means of a feed screw arranged underneath the knife-supporting shredding device. However, said feed screw discharges into the open and hence no or only a very slight counterpressure will be built up, and consequently there will also be no deflection of the screw. If in said device an extruder screw was directly connected to the feed screw, the same disadvantages as described above would occur.

In document EP 0 329 934 A2, an extruder with a split extruder screw is disclosed, whereby the individual screw parts are rotatable independently of each other. The screw part being the rear part relative to the discharge opening is configured so as to be hollow and receives in its interior a rotating shaft having its front end connected to the front screw part in a torque-proof manner. The front screw part is supported only by the shaft arranged in the rear screw part by means of an axial bearing. Thus, the rear screw part forms an abutment for the axial bearing of the shaft and hence also an abutment for the front screw part. However, said extruder does not exhibit a separate abutment body for the rear screw part.

All above-mentioned devices have a common disadvantage in that increased deflection forces occur because of the material transfer from the knife-supporting shredding device to the feed or extruder screw, which deflection forces are oriented normally to the centre line of the consecutively arranged shredding and extruder shafts, thus leading to increased wear in the feed area of the extruder or feed screw if an additional discharge-end bearing is omitted, and/or in that the known embodiments of discharge-end bearings lead to substantial curtailments of the material transport or to an increased thermal load of the material.

SUMMARY OF THE INVENTION

The present invention provides a solution to the illustrated problems. The present invention is a device for compacting loosely packed materials, in particular synthetic materials. The device has a shredder/conveyor rotor body arranged in a casing and rotatably drivable around and axis of rotation. The device further includes a consecutively arranged extruder with an extruder screw that is arranged rotatably and coaxially to the shredder/conveyor rotor body so that materiasl supplied to the shredder/conveyor are conveyed to the extruder screw. The materials are then optionally shredded. The shredder/conveyor rotor body can be configured as a hollow body open at the front side opposite the extruder and has at least one rotary bearing in its interior, which rotary bearing rests on an abutment body projecting from the open front side into the interior of the shredder/conveyor rotor body.

By said solution according to the invention of arranging bearings, in-particular the bearing opposite the drive, on the inside of the shredder/conveyor rotor body, it is no longer necessary to cut back on the rigidity of the bearing, and wear of the feed area of the extruder will be reduced substantially. Moreover, the transfer area between the shredder/conveyor rotor body and the extruder screw is free of webs or supports which would impede the material transport. Furthermore, the shredder/conveyor rotor body can be liquid-cooled on its inside.

Advantageous embodiments of the invention are illustrated in the dependent claims.

The maintenance of the device is rendered particularly easy and the replacement of parts is facilitated if the abutment body is introducible from the outside of the casing through an opening in the casing into the hollow space of the shredder/conveyor rotor body. A spacesaving design and easy maintenance can be achieved by means of an embodiment wherein the abutment body is a hollow body open at both ends, through the interior of which a drive shaft of the extruder screw passes. This design also renders it possible to position the drive shaft of the extruder screw in the interior of the abutment body.

The invention provides various possibilities of driving the shredder/conveyor rotor body and the extruder screw. Thus, the shredder/conveyor rotor body and the extruder screw can be driven via a common drive motor, whereby facultatively separate transmissions may be provided for achieving different rotational speeds. Alternatively, the shredder/conveyor rotor body and the extruder screw may possess separate drives, providing extensive possibilities of control.

In order to always ensure sufficient material supply, in one further development of the invention a movable pressing device is provided, by means of which supplied materials are pressed against the shredder/conveyor rotor body. Said pressing device may be operated electrically or hydraulically and preferably provides a control which depends on the load of the shredder/conveyor rotor body, whereby the load can be determined via pressure elements or the current consumption of the drive motor.

In order to support the material delivery along the axis of rotation of the shredder/conveyor rotor body, respective devices, in particular helical webs or grooves and/or air nozzles, are optionally provided in the part of the casing surrounding the shredder/conveyor rotor body.

In order to improve the compaction of the material, a tapered, preferably cooled compacting section can be interposed between the shredder/conveyor rotor body and the extruder. In the compacting section, a temperature sensor for measuring the inner wall temperature of the compacting section or the temperature of the material passed through is preferably provided, with the material flow rate being regulated depending on the measured temperature and optionally on the load of the shredder/conveyor rotor body. In a further embodiment, the material flow rate is regulated by means of a slide at the input of the compacting section.

The shredder/conveyor rotor body is preferably a cylindrical or conical body, whereby, in the latter case, an additional compactinn of the conveyed material can be achieved.

According to a preferred embodiment of the invention, the shredder/conveyor rotor body is configured as a shredder shaft carrying a plurality of knives at its periphery which form narrow shear gaps together with counter knives arranged at the casing in a stationary manner.

According to an alternative embodiment of the invention, the shredder/conveyor rotor body is configured as a feed screw. Thereby, a shredder shaft can be provided upstream in parallel to the axis or at an angle to the feed screw, which shaft carries a plurality of knives at its periphery which preferably form narrow shear gaps together with counter knives arranged at the casing in a stationary manner. A screen is provided between the shredder shaft and the feed screw so as to supply only shredded material of a defined maximum size to the feed screw.

BRIEF DESCRIPTION OF THE DRAWINGS

The invention will now be illustrated in further detail by way of non-limiting exemplary embodiments with reference to the drawings. In respective longitudinal sections.

DETAILED DESCRIPTION OF THE INVENTION

Figure 1:
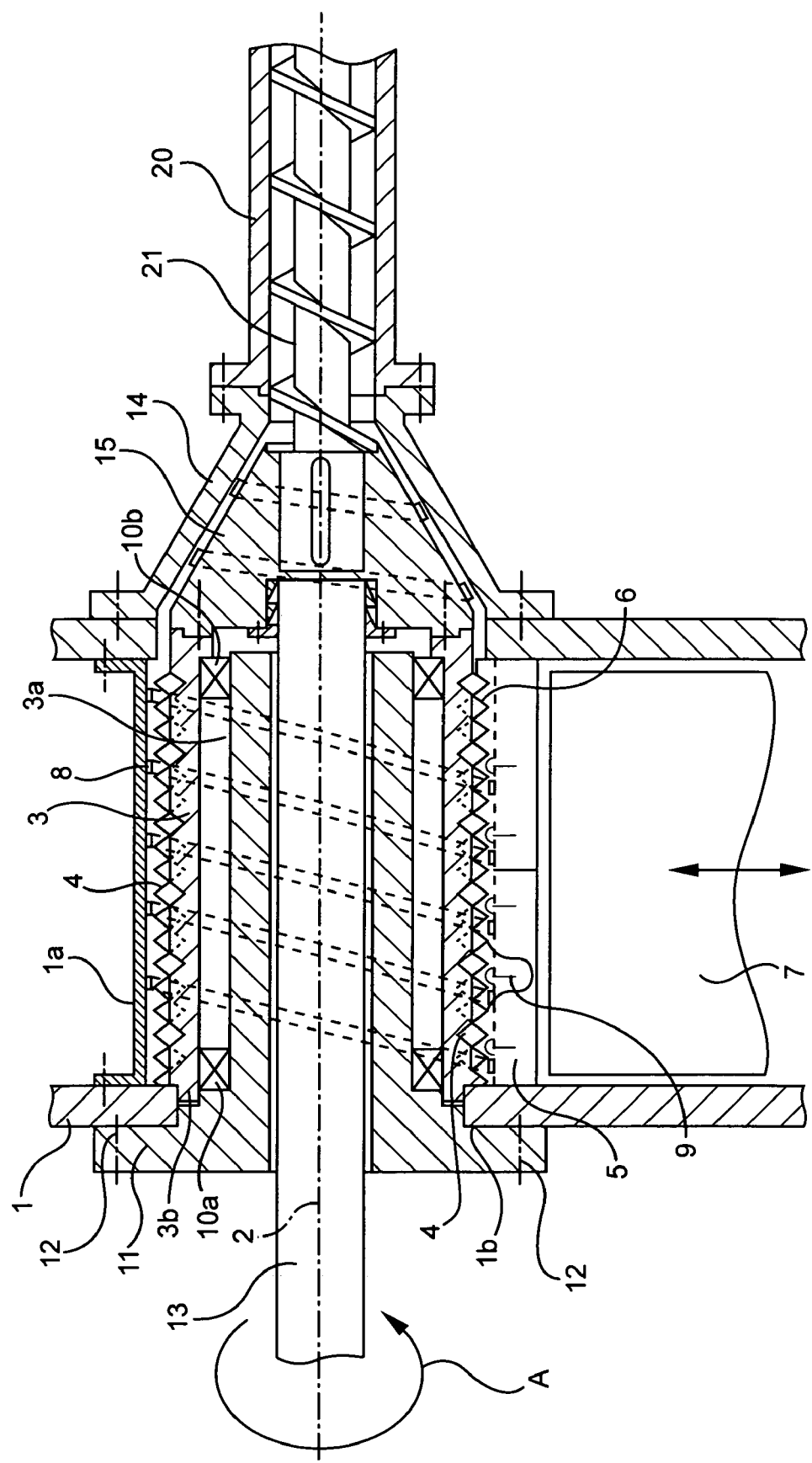
FIG. 1 shows an embodiment with a shredder shaft and a consecutively arranged extruder.

First with reference to FIG. 1, there is illustrated, in longitudinal section, a first embodiment of the device according to the invention for compacting loosely packed materials, in particular synthetic materials. Said device comprises a casing 1, 1a, in which a shredder/conveyor rotor body configured as a shredder shaft 3 is rotatably arranged around an axis of rotation 2 (arrow A). The shredder shaft 3 has a plurality of mutually offset knives 4 at its peripheral surface, which may be arranged helically around the periphery. Opposite to the rotating knives 4 there are stationary knives 5 extending inwardly from the casing 1a so that between the knives 4 and 5 narrow shear gaps 6 are formed.

In a manner which is known and therefore not illustrated, material to be shredded is supplied to the shredder shaft 3 via a feeding hopper, using suitable conveyor means such as conveyor belts, a roll feeder, a lifting and tipping device or by manual charging. The material can thereby be pressed radially against the shredder shaft 3 by gravity or—such as shown in FIG. 1—by means of a pressing device shaped like a pressure slide 7, whereby the material is drawn into the shear gaps 6 and is shredded between the rotating and stationary knives 4, 5. The pressure slide 7 is hydraulically or electrically movable radially toward the shredder shaft 3. The knives 4 are arranged helically and thus cause an axial discharge of the shredded material. The axial conveying effect is increased by helical webs 8 or helical grooves (not illustrated) mounted to the inside of the casing, which prevent the material from rotating together with the shredder shaft and at the same time provide the material with a movement component in the discharge direction. A further enhancement of the axial material delivery is achieved by air nozzles 9.

The shredder shaft 3 is configured as a hollow body which is open at the front side opposite the extruder (at 3b) and comprises an interior space 3a. In said interior, two rotary bearings 10a, 10b are arranged which rest on the periphery of an abutment body 11 projecting into the interior 3a, thus supporting the shredder shaft in a rotatable fashion, whereby the radial forces applied by the pressed material are effectively absorbed but not transferred to the subsequent extruder screw 21.

The abutment body 11 is in turn conducted from the outside of the casing 1, through an opening 1b in the casing, into the interior 3a of the shredder shaft 3 and is screwed to the casing 1 by the use of screws 12. Thus, the device can easily be dismantled for the purpose of replacing parts such as bearings 10a, 10b.

A compacting section 14, which is flanged to the casing 1, and an extruder 20, which is flanged to the output of the compacting section, are provided downstream of the shredder shaft. A conical compacting screw 15 rotatable around the axis of rotation 2 is arranged in the compacting section. An extruder screw 21, which likewise is rotatable around the axis of rotation 2, is arranged in the extruder 20. Thus, the shredder shaft 3, the compacting screw 15 and the extruder screw 21 are arranged coaxially. The compacting screw 15 and the extruder screw 21 are rigidly connected with each other via a spline-shaft connection or the like. Furthermore, a drive shaft 13 is rigidly connected with the compacting screw 15. The drive shaft 13 projects through the abutment body 11 configured as a hollow body and from the casing 1 and is connected to a drive motor (not illustrated). The shredder shaft 3 is also rigidly connected with the compacting screw 15. Thus, the drive shaft 13 drives both the shredder shaft 3 and the extruder screw 21 via the compacting screw 15.

Figure 2:
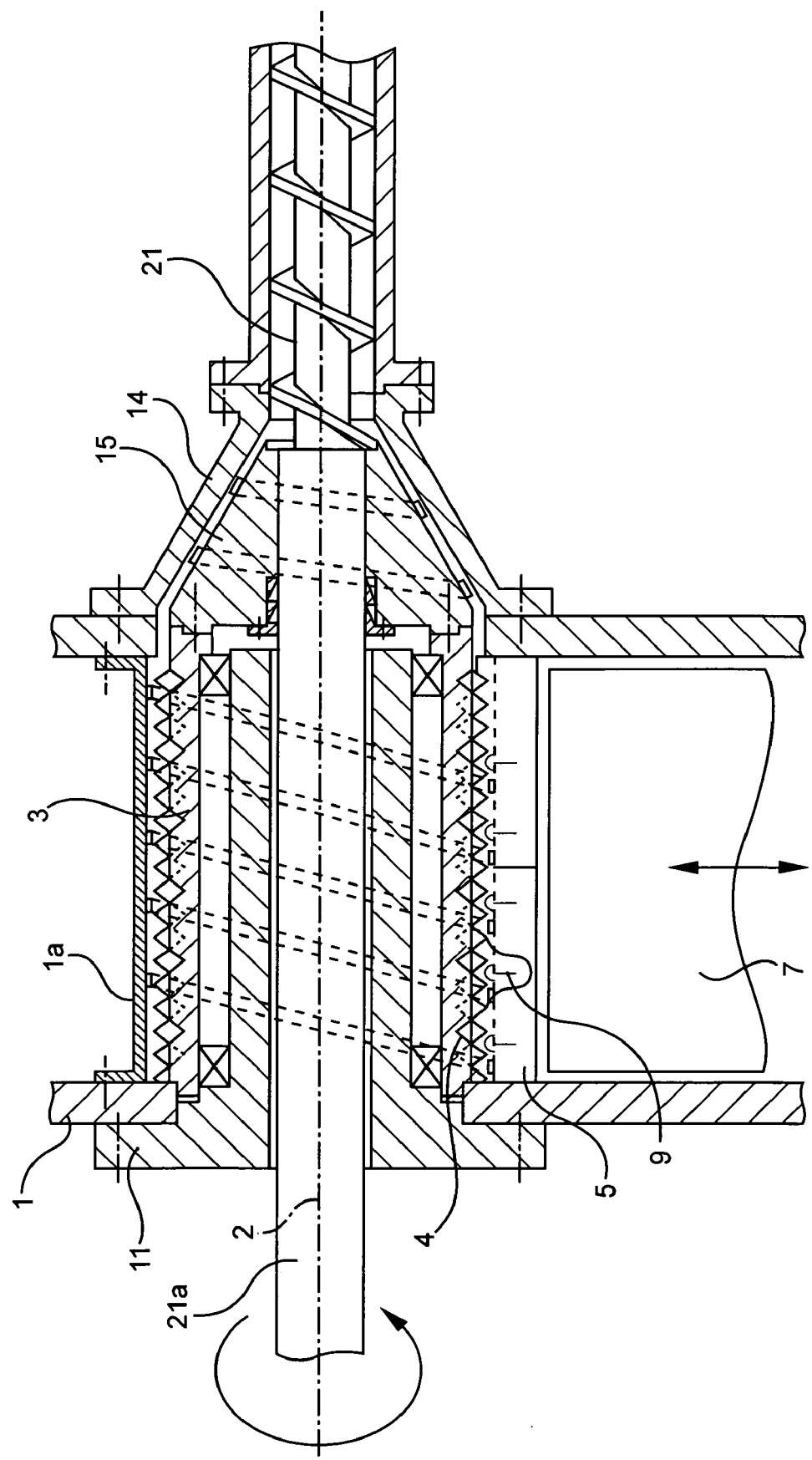
FIG. 2 shows an embodiment with a shredder shaft and an extruder with an extended extruder shaft.

FIG. 2 shows in longitudinal section another embodiment of a shredding and compacting device according to the invention, which differs from the device as illustrated in FIG. 1 only in that, instead of a drive shaft for the compacting screw 15, the extruder shaft 21a of the extruder screw 21 is conducted through the interior of the hollow abutment body 11 and out of the casing. Thereby, the extruder shaft 21a is rigidly connected with the compacting screw 15, thus driving the same as well as the shredder shaft 3 which is rigidly connected to the compacting screw 15. The remaining parts and reference numerals are equal to those in FIG. 1; a new discussion can therefore be omitted.

Figure 3:
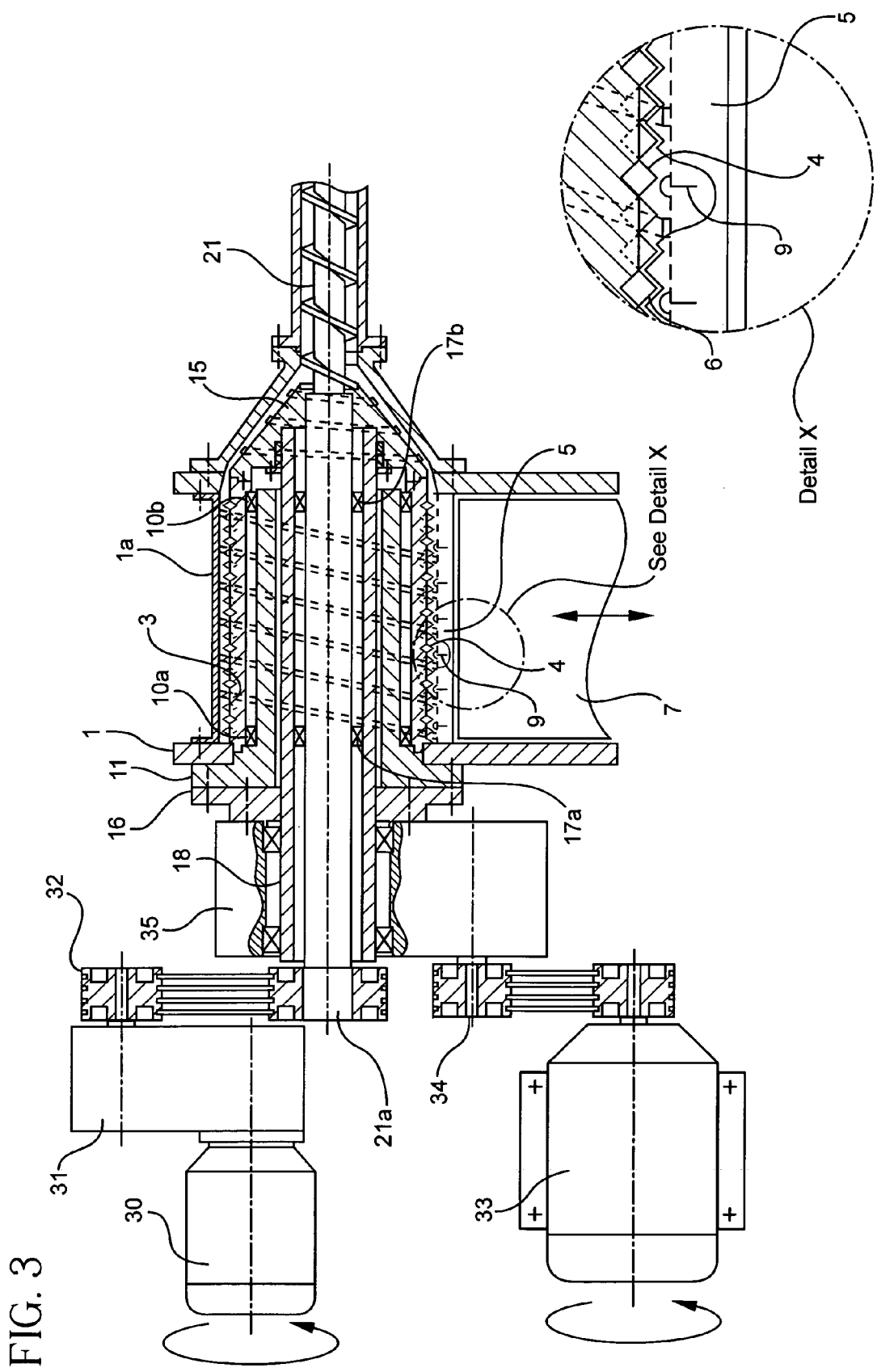
FIG. 3 shows an embodiment with two separate drives for the shredder shaft and the extruder.

FIG. 3 shows, in longitudinal section, a further embodiment of the shredding and compacting device according to the invention. Said embodiment differs in the following features from the embodiment of FIG. 2. The extruder screw 21 and the shredder shaft 3 are driven via separate drive trains. More precisely, the extruder shaft 21a is driven by an electric motor 30 via a transmission element 32 and a gear 31. The shredder shaft 3 and the compacting screw 15 rigidly connected to it are driven by an electric motor via a drive shaft 18, a gear 35 and a transmission element 34, with the gear 35 being connected to the abutment body 11 via a flange 16. The drive shaft 18 is a hollow shaft which, at one end, is connected to the compacting screw 15 via a keyway connection and whose other end extends through the abutment body 11 and from the casing 1. The extruder shaft 21a extends through the hollow drive shaft 18 and from the casing 1 and is rotatably mounted to the inside of the drive shaft 18 by means of bearings 17a, 17b.

Detail X of FIG. 3 shows, in an enlarged illustration, the rotating knives 4 of the shredder shaft, the stationary knives 5, the shear gap 6 formed therebetween and an air nozzle 9 for supporting the material transport.

The remaining parts of the embodiment of FIG. 3 are equal to those in FIGS. 1 and 2 and are therefore indicated by the same reference numerals. In terms of their explanation, reference is to be made to the above-indicated description.

Figure 4:
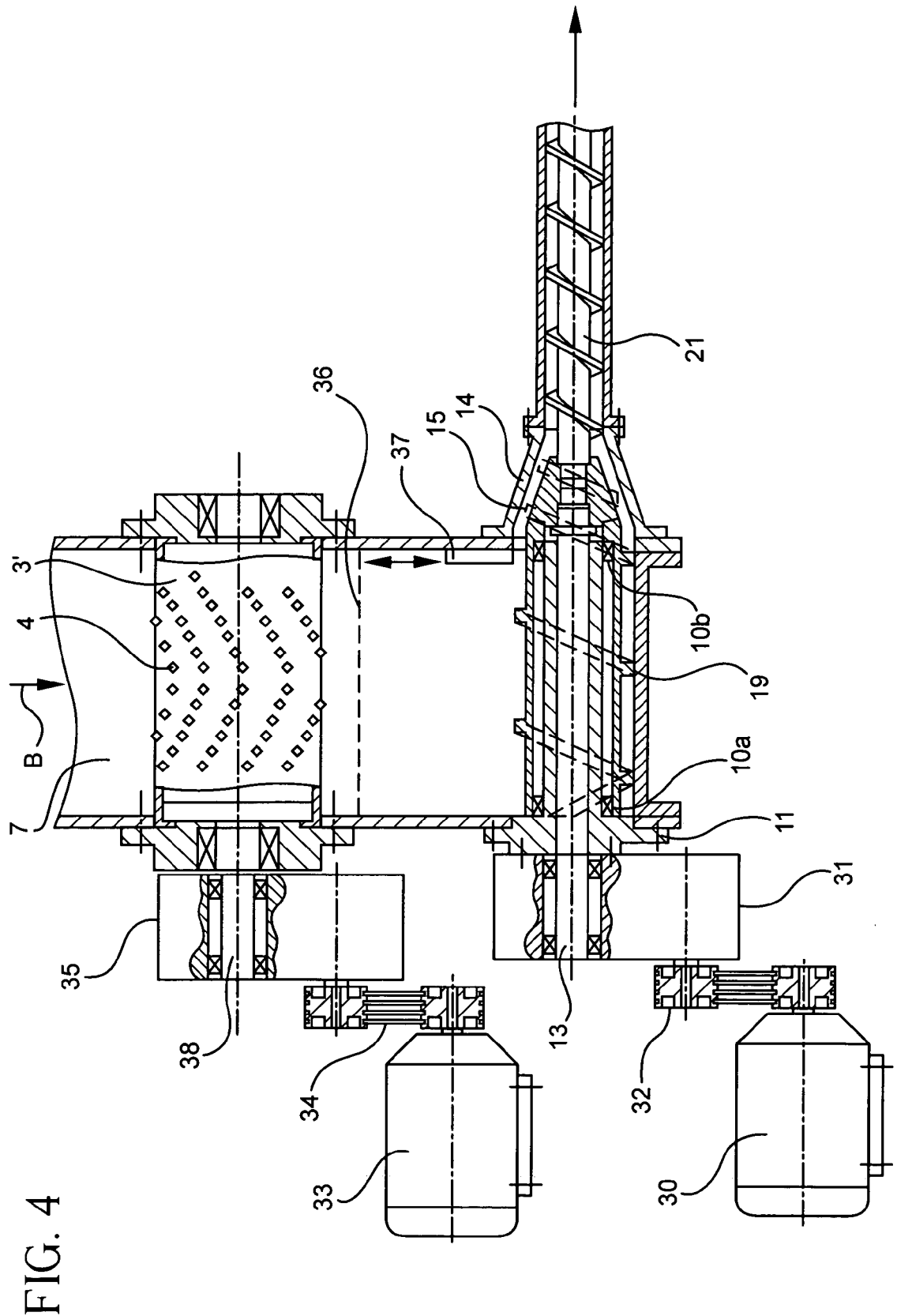
FIG. 4 shows an embodiment with a preceding single-shaft shredder and a consecutively arranged feed screw, compacting screw and extruder.

In FIG. 4, another embodiment according to the invention is illustrated. Said embodiment differs from the so far illustrated embodiments in that the shredder/conveyor rotor body is configured as a feed screw 19, which, at one end, merges integrally and coaxially into the compacting screw 15. The feed screw 19 is a hollow body in the interior of which—like in the above-mentioned embodiments—bearings 10a, 10b are arranged which rest rotatably on the abutment body 11 projecting into the interior of the feed screw 19. A drive shaft 13 extends through the abutment body 11 and is, at one end, rigidly connected with both the compacting screw 15 and the extruder screw 21 in order to drive those elements. At its other end, the drive shaft 13 (such as shaft 21 in FIG. 3) is connected to the gear 31, which in turn is driven by the electric motor 30 via the transmission element 32. In parallel to the axis but at a distance from the feed screw 19, a shredder shaft 3' is arranged with its rotating knives 4 and is driven by the electric motor 33 via the shaft 38, the gear 35, the transmission element 34. Synthetic material to be shredded is supplied to the shredder shaft 3' in the direction of arrow B and with the support of the pressure slide 7 and is shredded by said shaft. A screen 36 beneath the shredder 3' makes sure that only shredded particles of a certain maximum size can get to the feed screw 19 located underneath. A temperature sensor (not illustrated) in the compacting section 14 measures the inner wall temperature of the compacting section and passes the measured values on to a control unit (not illustrated), which regulates the material flow rate depending on said temperature and optionally on other machine parameters by increasing or reducing the clear width of the feed area of the compacting screw 15 through the actuation of a feed slide 37.

The invention claimed is:

1. A device for compacting loosely packed materials comprising a shredder/conveyor rotor body arranged in a casing and rotatably drivable around an axis of rotation and a consecutively arranged extruder with an extruder screw that is arranged rotatably and coaxially to the shredder/conveyor rotor body so that loosely packed materials supplied to the shredder/conveyor rotor body are conveyed to the extruder screw, and wherein the shredder/conveyor rotor body is configured as a hollow body open at the front side opposite the extruder and has at least one rotary bearing in the interior of the shredder/conveyor rotor body, wherein the at least one rotary bearing rests on a stationary abutment body projecting from the open front side into the interior of the shredder/conveyor rotor body.

2. A device according to claim 1, wherein the stationary abutment body is insertible from the outside of the casing through an opening in the casing into the hollow space of the shredder/conveyor rotor body.

3. A device according to claim 1, wherein the stationary abutment body is a hollow body open at both ends, through the interior of which a drive shaft of the extruder screw passes.

4. A device according to claim 3, wherein the drive shaft of the extruder screw runs on bearings positioned in the interior of the stationary abutment body.

5. A device according to claim 1, wherein the shredder/conveyor rotor body and the extruder screw are driven via a common drive motor.

6. A device according to claim 5, wherein the shredder/conveyor rotor body and the extruder screw are driven via separate transmissions.

7. A device according to claim 1, wherein the shredder/conveyor rotor body and the extruder screw comprise separate drives.

8. A device according to claim 1, further comprising a movable pressing device for pressing the supplied loosely packed materials against the shredder/conveyor rotor body.

9. A device according to claim 8, wherein the movable pressing device is controllable depending on the load on the shredder/conveyor rotor body.

10. A device according to claim 9, further comprising a drive motor for driving the shredder/conveyor rotor body and the extruder screw, and wherein the load is determined by the current consumption of the drive motor.

11. A device according to claim 9, further comprising pressure gauges for determining the load on the shredder/conveyor rotor body.

12. A device according to claim 1, further comprising in the part of the casing surrounding the shredder/conveyor rotor body devices for supporting delivery of the loosely packed materials.

13. A device according to claim 12, wherein the devices for supporting delivery of the loosely packed materials comprise at least one of helical webs, grooves, and air nozzles.

14. A device according to claim 1, wherein the shredder/conveyor rotor body is liquid-cooled on its inside.

15. A device according to claim 1, further comprising a tapered, cooled compacting section interposed between the shredder/conveyor rotor body and the extruder.

16. A device according to claim 15, the tapered compacting section comprising a temperature sensor for measuring one of the inner wall temperature of the tapered compacting section and the temperature of the material passed through, and wherein the material flow rate is regulated depending on the measured temperature.

17. A device according to claim 16, further comprising a slide at the input of the compacting section for regulating the material flow, and wherein the material flow rate is regulated depending on both the measured temperature and on the load on the shredder/conveyor rotor body.

18. A device according to claim 1, wherein the shredder/conveyor rotor body is one of a cylindrical and a conical body.

19. A device according to claim 1, wherein the shredder/conveyor rotor body, is configured as a shredder shaft for shredding the loosely packed materials, and wherein the shedder shaft comprises a plurality of knives at its periphery which form narrow shear gaps together with counter knives arranged at the casing in a stationary manner.

20. A device according to claim 1, wherein the shredder/conveyor rotor body is configured as a feed screw.

21. A device according to claim 20, further comprising a shredder shaft positioned upstream, wherein the shredder shaft carries a plurality of knives at its periphery which form narrow shear gaps together with counter knives arranged at the casing in a stationary manner.

22. A device according to claim 21, further comprising a screen positioned between the shredder shaft and the feed screw.

23. A device for compacting loosely packed synthetic materials, comprising a shredder/conveyor rotor body arranged in a casing and rotatably drivable around an axis of rotation and a consecutively arranged extruder with an extruder screw that is arranged rotatably and coaxially to the shredder/conveyor rotor body so that loosely packed synthetic materials supplied to the shredder/conveyor rotor body are conveyed to the extruder screw and shredded, and wherein the shredder/conveyor rotor body is configured as a hollow body open at the front side opposite the extruder and has at least one rotary bearing in the interior of the shredder/conveyor rotor body, wherein the at least one rotary bearing rests on a stationary abutment body projecting from the open front side into the interior of the shredder/conveyor rotor body.

* * * * *